United States Patent
Schrader (10) Patent No.: US 10,345,501 B2
(45) Date of Patent: Jul. 9, 2019

(54) APPARATUS COMPRISING A LIGHT SOURCE GUIDE ELEMENT CONFIGURED TO ENABLE A PLURALITY OF IMAGES TO BE CAPTURED AND RELATED METHOD

(71) Applicant: Nokia Technologies Oy, Espoo (FI)

(72) Inventor: Martin Schrader, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/432,891

(22) PCT Filed: Oct. 5, 2012

(86) PCT No.: PCT/IB2012/055363
§ 371 (c)(1),
(2) Date: Apr. 1, 2015

(87) PCT Pub. No.: WO2014/053883
PCT Pub. Date: Apr. 10, 2014

(65) Prior Publication Data
US 2015/0277014 A1  Oct. 1, 2015

(51) Int. Cl.
| | |
|---|---|
| H04N 5/225 | (2006.01) |
| G02B 6/00 | (2006.01) |
| G03B 35/10 | (2006.01) |
| G03B 35/12 | (2006.01) |
| G02B 27/22 | (2018.01) |
| G02B 3/00 | (2006.01) |

(Continued)

(52) U.S. Cl.
CPC ............ *G02B 6/00* (2013.01); *G02B 3/0062* (2013.01); *G02B 5/20* (2013.01); *G02B 6/0035* (2013.01); *G02B 6/34* (2013.01); *G02B 27/2235* (2013.01); *G02B 27/4205* (2013.01); *G02B 27/4272* (2013.01); *G03B 35/10* (2013.01); *G03B 35/12* (2013.01); *H04N 5/2254* (2013.01)

(58) Field of Classification Search
CPC ........................................................ G01J 3/02
USPC ............................................ 348/343; 359/619
See application file for complete search history.

(56) References Cited

U.S. PATENT DOCUMENTS

| | | | |
|---|---|---|---|
| 5,581,378 A | 12/1996 | Kulick et al. | 359/9 |
| 7,016,569 B2 | 3/2006 | Mule et al. | 385/37 |

(Continued)

FOREIGN PATENT DOCUMENTS

| | | |
|---|---|---|
| CN | 202127481 A | 1/2012 |
| CN | 102375320 A | 3/2012 |

(Continued)

OTHER PUBLICATIONS

"The Automatic Microscope", Nikon MicroscopyU, 12 pgs., Mar. 3, 2015, http://www.microscopy.com/articles/livecellimaging/automaticmicroscope.html.

(Continued)

*Primary Examiner* — Joel W Fosselman
(74) *Attorney, Agent, or Firm* — Harrington & Smith (57) ABSTRACT

An apparatus and method, the apparatus including a light guide element including a plurality of input diffraction gratings configured to couple a plurality of incident beams of light into the light guide element and at least one output diffraction grating configured to couple the plurality of beams of light out of the light guide element to at least one image sensor to enable a plurality of images to be captured.

20 Claims, 8 Drawing Sheets

(51) Int. Cl.
  *G02B 27/42* (2006.01)
  *G02B 6/34* (2006.01)
  *G02B 5/20* (2006.01)
  *F21V 8/00* (2006.01)

(56) References Cited

U.S. PATENT DOCUMENTS

| | | | |
|---|---|---|---|
| 7,110,103 B2 | 9/2006 | Montgomery et al. | 356/152.1 |
| 2003/0081321 A1* | 5/2003 | Moon | G02B 6/262 359/619 |
| 2004/0114145 A1* | 6/2004 | Thirstrup | G01N 21/7703 356/445 |
| 2007/0070504 A1* | 3/2007 | Akutsu | G02B 5/1861 359/573 |
| 2009/0174919 A1 | 7/2009 | Moss | 359/23 |
| 2009/0245730 A1 | 10/2009 | Kleemann | 385/37 |
| 2010/0002302 A1 | 1/2010 | Duparre et al. | 359/571 |
| 2010/0073633 A1 | 3/2010 | Uchida et al. | 351/206 |
| 2010/0246892 A1 | 9/2010 | Hirasawa et al. | 382/106 |
| 2010/0302276 A1 | 12/2010 | Levola | |
| 2010/0321688 A1* | 12/2010 | Bodkin | G01J 3/02 356/326 |
| 2011/0102562 A1 | 5/2011 | Johnson, Jr. et al. | 348/58 |
| 2011/0316975 A1 | 12/2011 | Tan | 348/46 |
| 2012/0140044 A1 | 6/2012 | Galstian et al. | 348/47 |

FOREIGN PATENT DOCUMENTS

| | | |
|---|---|---|
| EP | 1763259 A2 | 3/2007 |
| GB | 2 294 552 A | 5/1996 |
| JP | 2010-2233 | 1/2010 |
| JP | 2012150341 A | 8/2012 |
| SU | 1569786 * | 6/1990 |
| WO | WO-2007/141589 A1 | 12/2007 |
| WO | WO-2010/142338 A1 | 12/2010 |
| WO | WO 2011/063347 A2 | 5/2011 |

OTHER PUBLICATIONS

"Lenses: Multi-layer Diffractive Optical Element", Canon Professional Network—Multi-layer Diffractive Optical Element, 4 pgs. Mar. 3, 2015, http://cpn.canon-europe.com/content/education/infobank/lenses/multi_layer_diffractive_optical_element.do.

"Wafer level Optics—Introduction and Solutions Available for Wafer Level Optics by EV Group", 4 pgs., Mar. 3, 2015, http://www.azonano.com/article.aspx?ArticleID=2769.

* cited by examiner

APPARATUS COMPRISING A LIGHT SOURCE GUIDE ELEMENT CONFIGURED TO ENABLE A PLURALITY OF IMAGES TO BE CAPTURED AND RELATED METHOD

TECHNOLOGICAL FIELD

Embodiments of the present invention relate to an apparatus and method for capturing images. In particular, they relate to an apparatus and method for capturing multiple images.

BACKGROUND

Apparatus which enable multi-view images, such as stereo images, to be created are known.

Such apparatus require multiple individual images to be obtained. To enable the multiple individual images to be combined into a single image it may be necessary to have accurate alignment of individual image capturing components or to use software to align the images accurately.

BRIEF SUMMARY

According to some, but not necessarily all, embodiments of the disclosure there may be provided an apparatus comprising: a light guide element comprising a plurality of input diffraction gratings configured to couple a plurality of incident beams of light into the light guide element and at least one output diffraction grating configured to couple the plurality of beams of light out of the light guide element to at least one image sensor to enable a plurality of images to be captured.

In some embodiments the plurality of input diffraction gratings may be spaced from each other.

In some embodiments the plurality of incident beams of light may originate from different sources and may contain different information.

In some embodiments the input diffraction gratings and the at least one output diffraction gratings may have the same periodic spacing.

In some embodiments the input diffraction gratings and the at least one output diffraction gratings may be parallel with each other.

In some embodiments the apparatus may comprise a plurality of filters configured to filter the plurality of incident beams of light. In such embodiments a first filter may be arranged to filter a beam of light before it is incident on an input diffraction grating and a matching filter may be arranged to filter a beam of light provided to the image sensor.

In some embodiments the apparatus may comprise a plurality of shutters which may be configured so that the plurality of incident beams of light are coupled into the light guide element at different times.

In some embodiments one output diffraction grating may be configured on the light guide to couple the plurality of beams of light out of the light guide element at the different times.

In some embodiments the light guide may comprise a plurality of output diffraction gratings configured to couple the plurality of beams of light out of the light guide element simultaneously. In some embodiments the number of input diffraction gratings may be equal to the number of output diffraction gratings. In some embodiments the apparatus may comprise a plurality of image sensors which may be configured to detect the plurality of beams of light from the plurality of output diffraction gratings and capture a plurality of images simultaneously.

In some embodiments the light guide may be mounted on a substrate.

In some embodiments the image sensor may be mounted on a substrate.

In some embodiments a collimating optical arrangement may be mounted on a substrate overlaying the light guide.

In some embodiments a focusing optical arrangement may be mounted on a substrate between the light guide and the image sensor.

According to some, but not necessarily all, embodiments of the disclosure there may be provided a method comprising: configuring a plurality of input diffraction gratings of a light guide element to couple a plurality of incident beams of light into the light guide element and; configuring at least one output diffraction grating of the light guide element to couple the plurality of beams of light out of the light guide element to at least one image sensor to enable a plurality of images to be captured.

In some embodiments the plurality of input diffraction gratings may be configured to be spaced from each other.

In some embodiments the plurality of incident beams of light may originate from different sources and may contain different information.

In some embodiments the input diffraction gratings and the at least one output diffraction gratings may be configured to have the same periodic spacing.

In some embodiments the input diffraction gratings and the at least one output diffraction gratings may be configured to be parallel with each other.

In some embodiments the method may further comprise configuring a plurality of filters to filter the plurality of incident beams of light.

In some embodiments the method may further comprise configuring a first filter to filter a beam of light before it is incident on an input diffraction grating and configuring a matching filter arranged to filter a beam of light provided to the image sensor.

In some embodiments the method may further comprise configuring a plurality of shutters so that the plurality of incident beams of light may be coupled into the light guide element at different times.

In some embodiments one output diffraction grating may be configured on the light guide to couple the plurality of beams of light out of the light guide element at the different times.

In some embodiments the method may further comprise configuring a plurality of output diffraction gratings to couple the plurality of beams of light out of the light guide element simultaneously. In some embodiments the number of input diffraction gratings may be equal to the number of output diffraction gratings. In some embodiments the apparatus may comprise a plurality of image sensors which may be configured to detect the plurality of beams of light from the plurality of output diffraction gratings and capture a plurality of images simultaneously.

In some embodiments the method may further comprise mounting the light guide on a substrate.

In some embodiments the method may further comprise mounting the image sensor on a substrate.

In some embodiments the method may further comprise mounting a collimating optical arrangement on a substrate overlaying the light guide.

In some embodiments the method may further comprise mounting a focusing optical arrangement on a substrate between the light guide and the image sensor.

According to some, but not necessarily all, embodiments of the disclosure there may be provided a method comprising: mounting at least one image sensor on a substrate; mounting a light guide element to the substrate wherein the light guide element comprises a plurality of input diffraction gratings configured to couple a plurality of incident beams of light into the light guide element and at least one output diffraction grating configured couple the plurality of beams of light out of the light guide element to the at least one image sensor to enable a plurality of images to be captured.

In some embodiments the substrate may comprise a wafer substrate.

In some embodiments the method may further comprise mounting a focusing optical arrangement on a substrate between the image sensor and the light guide.

In some embodiments the method may further comprise mounting a collimating optical arrangement on a substrate overlaying the light guide.

In some embodiments the method may further comprise providing spacer layers between the substrates.

The apparatus may be for capturing images.

BRIEF DESCRIPTION

For a better understanding of various examples of embodiments of the present invention reference will now be made by way of example only to the accompanying drawings in which.

DETAILED DESCRIPTION

The Figures illustrate an apparatus 1 comprising: a light guide element 3 comprising a plurality of input diffraction gratings 5 configured to couple a plurality of incident beams of light 11 into the light guide element 3 and at least one output diffraction grating 7 to configured couple the plurality of beams of light 15 out of the light guide element 3 to at least one image sensor 9 to enable a plurality of images to be captured.

In the embodiments described the term "coupled" means operationally coupled and any number or combination of intervening elements may exist between coupled components (including no intervening elements).

The apparatus 1 may be part of an image capturing device such as a camera. The camera may be incorporated into a device such as a mobile telephone or tablet computer or other electronic apparatus. The apparatus 1 may be, for example, an image capturing module.

Figure 1A:
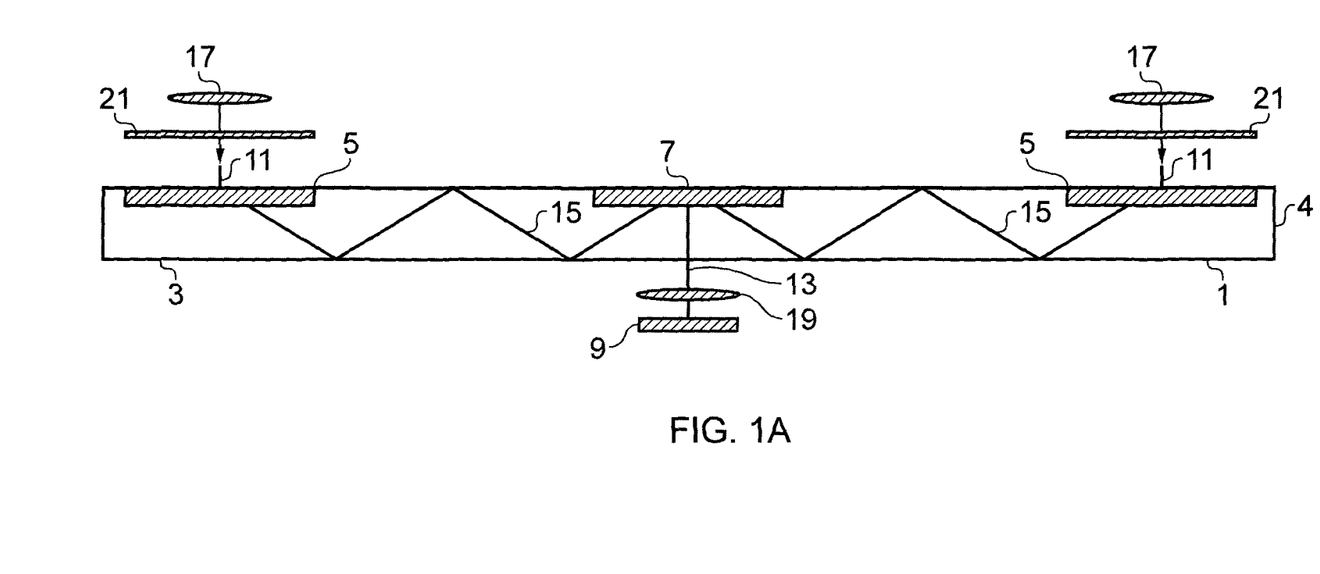
FIGS. 1A and 1B schematically illustrate apparatus according to a first example embodiment of the disclosure.

The apparatus 1 illustrated in FIG. 1A comprises a light guide element 3 where the light guide element 3 comprises a plurality of input diffraction gratings 5 and an output diffraction grating 7. In the example embodiment of FIG. 1A the apparatus 1 also comprises an image sensor 7, a focussing optical arrangement 13, a plurality of collimating optical arrangements 17 and a plurality of shutters 21. It is to be appreciated that only the components of the apparatus 1 which are necessary for the following description are illustrated in FIG. 1A and that other components may be included in other embodiments of the disclosure.

The example apparatus 1 illustrated in FIG. 1A comprises a plurality of collimating optical arrangements 17. In some embodiments of the invention a collimating optical arrangement 17 may be provided for each of the plurality of input diffraction gratings 5. Each collimating optical arrangement 17 may be arranged to provide a beam of light to a different input diffraction grating 5.

The collimating optical arrangements 17 may comprise any means configured to provide a beam of light comprising parallel rays. For example, the collimating optical arrangements 17 may comprise one or more lenses or any other suitable optical devices.

In the example embodiment of FIG. 1A a plurality of shutters 21 are provided. The shutters 21 are provided between the collimating optical arrangements 17 and the light guide element 3. The plurality of shutters 21 may be positioned so that there is shutter 21 provided between each input diffraction grating 5 and each collimating optical arrangement 17.

The shutter 21 may comprise any means which may be configured to obstruct a beam of light from the collimating optical arrangement 17 to prevent it from being incident on the light guide element 3. In the particular embodiment of FIG. 1A the shutters 21 may be configured to obstruct a beam of light from the collimating optical arrangement 17 to prevent it from being incident on the input diffraction grating 5. In some embodiments of the disclosure the shutter 21 may comprise a liquid crystal shutter. The liquid crystals in the shutter 21 may be configured to switch from transparent to opaque in response to a voltage applied to the liquid crystals. The voltage which is applied may be controlled to control the time at which the shutter 21 is open.

The light guide element 3 may comprise any means which may be configured to guide a beam of light from an input diffraction grating 5 to the output diffraction grating 7.

In the example embodiment illustrated in FIG. 1A the light guide element 3 comprises a flat substrate 4. Other shaped substrates 4 may be used in other embodiments of the disclosure. The substrate 4 may be made of any suitable material which enables an in-coupled beam of light 15 to be transmitted through the substrate 4. For example, the substrate 4 may be made of a transparent material such as glass or plastic.

In the embodiments of the disclosure the light guide element 3 comprises a plurality of diffraction gratings 5, 7. In the particular example of FIG. 1A the light guide element comprises a plurality of input diffraction gratings 5 and one output diffraction grating 7.

The input diffraction gratings 5 may be configured to couple an incident beam of light 11 from the collimating optical arrangement 17 into the light guide element 3. The output diffraction grating 7 may be configured to couple an in-coupled beam of light 15 out of the light guide element 3 to provide the out-coupled beam of light 13.

The diffraction gratings 5, 7 may comprise any suitable periodic structure. In some embodiments of the disclosure both the input diffraction gratings 5 and the output diffraction grating may have the same grating period.

The input diffraction gratings 5 and the output diffraction grating 7 may be provided on the surface of the substrate 4 of the light guide element 3. In the embodiment of FIG. 1A the input diffraction gratings 5 and the output diffraction grating 7 are provided on the same surface of the substrate 4. This may provide the benefit that it may be simpler to accurately manufacture a light guide element 3 having all of the diffraction gratings 5, 7 on the same surface of the substrate 4. This may also make it easier to align the input diffraction gratings 5 and the output diffraction grating 7 and to ensure that the diffraction gratings 5, 7 are parallel with each other. This may also make it easier to control the spacing between the respective diffraction gratings 5, 7.

The plurality of input diffraction gratings 5 are spatially separated from each other. There may be a region on the surface of the light guide element 3 which separates the input diffraction gratings 5 from each other. The plurality of incident beams of light 11 which are incident on the input diffraction gratings 5 are also spatially separated from each other. The incident beams of light 11 may originate from different locations so that different incident beams of light 11 contain different information.

The output diffraction grating 7 may be located between the input diffraction gratings 5. In the example embodiment of FIG. 1A two input diffraction gratings 5 are provided and the output diffraction grating 7 is positioned between the two input diffraction gratings 5. The output diffraction grating may be positioned so that it is equidistant from each of the input diffraction gratings 5.

In the embodiment illustrated in FIG. 1A an image sensor 9 is provided to detect the out-coupled beam of light 13 which is provided by the output diffraction grating 7. In the example embodiment of FIG. 1A only one image sensor 9 is provided.

The image sensor 9 may comprise any means which may be configured to convert an out-coupled beam of light 13 into an image. The image sensor 9 may comprise means for converting an out-coupled beam of light 13 into an electrical signal which can then be converted into an image. The image sensor 9 used in the apparatus 1 may comprise, for example, a digital CCD (charge coupled device) or a complementary metal-oxide-semiconductor (CMOS) sensor or any other suitable sensor. The image sensor 9 may be manufactured using any suitable technique.

A focusing optical arrangement 19 may be provided between the image sensor 9 and the output diffraction grating 7. The focusing optical arrangement 19 may comprise any suitable optical devices which may be configured to focus an out coupled beam of light 13 from the light guide element 3 onto the image sensor 9. For example the focusing optical arrangement 19 may comprise one or more lenses or any other suitable optical devices.

When the example apparatus 1 of FIG. 1A is in use a plurality of incident beams of light 11 are provided by the collimating optical arrangements 17. In the particular example of FIG. 1A the apparatus 1 comprises two input diffraction gratings 5 and two collimating optical arrangements 17 and so two incident beams of light 11 are provided. It is to be appreciated that in other embodiments more than two input diffraction gratings 5 may be provided.

The shutters 21 may be configured so that only one of the plurality of incident beams of light 11 is incident on a light guide element 3 at a time. As described above a shutter 21 may be provided between each of the collimating optical arrangements 17 and corresponding input diffraction grating 5. The shutters 21 may be controlled to open sequentially so that only one shutter 21 is open at a time. For example, in the apparatus of FIG. 1A the left hand shutter 21 may be opened and then closed and then immediately afterwards, or a short period of time afterwards, the right hand shutter 21 may be opened and closed. The shutters 21 may be configured to control the time at which an incident beam of light 11 is incident in an input diffraction grating 5.

When a shutter 21 is open the incident light beam 11 is provided from the collimating optical arrangement 17 and is coupled into the light guide element 3 by the input diffraction grating 5 which is associated with the open shutter 21.

The in-coupled beam of light 15 propagates through the light guide element 3. The light guide element 3 is configured to enable total internal reflection of the in-coupled beam of light 15. This means that the in-coupled beam of light 15 remains inside the light guide element 3 until it is incident upon the output diffraction grating 7.

The output diffraction grating 7 is configured to diffract the in-coupled beam of light 15 out of the light guide element 3 to provide an out-coupled beam of light 13.

The out-coupled beam of light 13 is provided to the image sensor 9 to enable an image to be captured corresponding to the incident beam of light 11. The focusing optical arrangement 9 may focus the out-coupled beam of light 13 onto the image sensor 9.

As the shutters 21 are configured so that only one incident beam of light 11 is incident on a light guide element 3 at a time each input diffraction grating 5 may input a different incident beam of light 11 at different times. The plurality of input diffraction gratings 5 may in-couple a plurality of incident beams of light 11 into the light guide element 3 sequentially. This may cause a plurality of out-coupled beams of light 13 to be provided sequentially where each of the out-coupled beams of light originates 13 from a different input diffraction grating 5. This may enable a plurality of images to be captured sequentially by the image sensor 9. As each of the original input beams of light 11 may come from a different location this may enable a plurality of different images to be captured.

Therefore the apparatus 1 of FIG. 1A may enable a plurality of different images to be captured from a plurality of different incident beams of light 11. The incident beams of light 11 may be spatially separated from each other. The different incident beams of light 11 may contain different information. The different images which are obtained from the different incident beams of light 11 may be processed to produce a single stereo or three dimensional image.

Figure 1B:
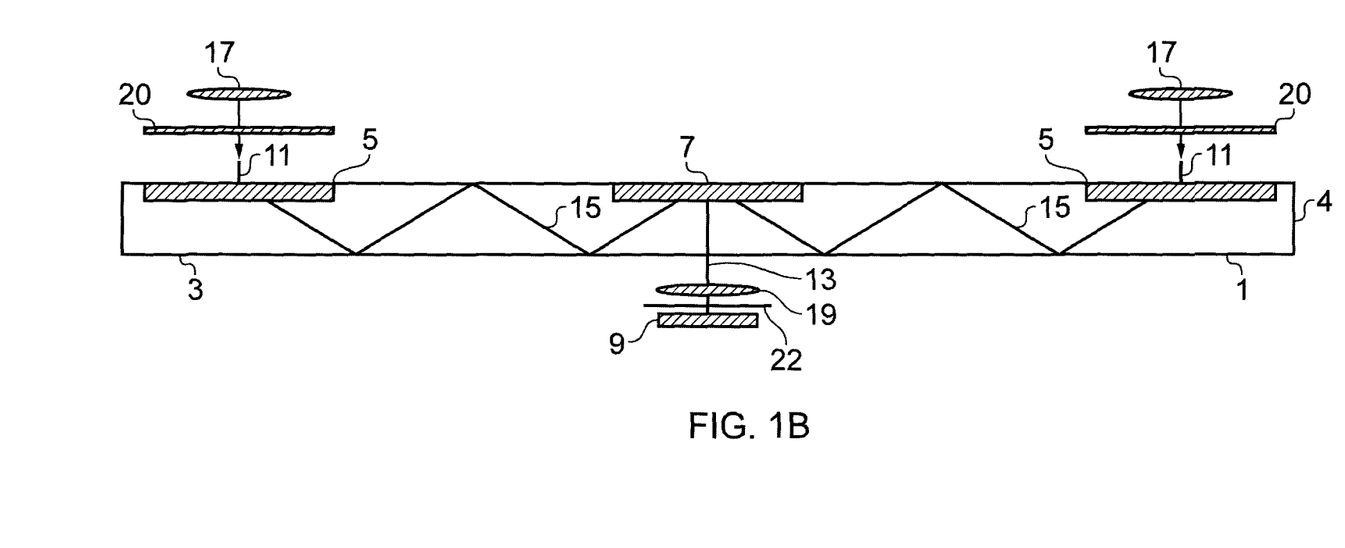

FIG. 1B illustrates an apparatus 1 according to another example embodiment of the disclosure. Where the components are the same or similar to the apparatus 1 illustrated in FIG. 1A the same reference numerals will be used.

The apparatus 1 illustrated in FIG. 1B is similar to the apparatus 1 illustrated in FIG. 1A in that it comprises a light guide element 3 and the light guide element 3 comprises a plurality of input diffraction gratings 5, and a single output diffraction grating 7. The apparatus of FIG. 1B also comprises a plurality of collimating optical arrangements 17 which are configured to provide a plurality of incident beams of light 11 as described above in relation to FIG. 1B. The apparatus 1 of FIG. 1B also comprises one image sensor 9 and focussing optical arrangement 19 which is configured so that out-coupled light from the output diffraction grating 7 is provided to the image sensor 9.

The apparatus 1 illustrated in FIG. 1B differs from the apparatus 1 of FIG. 1A in that the apparatus 1 of FIG. 1B comprises a plurality of filters 20, 22 rather than the plurality of shutters 21.

In the particular example of FIG. 1B a plurality of in-coupling filters 20 are arranged between the collimating optical arrangements 17 and the light guide element 3. The plurality of in-coupling filters 20 may be positioned so that there is shutter 21 provided between each input diffraction grating 5 and each collimating optical arrangement 17.

The in-coupling filters 20 may comprise any means which may be configured to filter a beam of light from the collimating optical arrangement 17. The in-coupling filters 20 may be configured so that only light having a specific characteristic is incident on the input diffraction grating 5. In some examples each of the plurality of in-coupling filters 20 may be arranged to filter different characteristics of the light so that each of the plurality of incident beams of light 11 have different characteristics. For example, in FIG. 1B the right-hand side in-coupling filter 20 may allow light having a first polarization or wavelength to pass through while the left-hand side in-coupling filter 20 may allow light having a second, different polarization or wavelength to pass through.

In the example embodiment of FIG. 1B an out-coupling filter 22 is also provided. The out-coupling filter 22 may be configured to filter an out-coupled beam of light 15 from the output diffraction grating 7. The out-coupling filter 22 may be provided between the output diffraction grating 7 and the image sensor 9. In some embodiments of the disclosure the out-coupling filter 22 may be provided on the pixels of the image sensor 9.

The out-coupling filter 22 may be arranged to correspond to one of the plurality of in-coupling filters 20. For example, in the embodiment of FIG. 1B the out-coupling filter 22 may be arranged to only transmit light which has passed through the left hand in coupling filter 20. A different out-coupling filter 22 may be arranged with a different image sensor 9 to only transmit light which has passed through the right hand in-coupling filter 20.

Therefore the apparatus 1 of FIG. 1B may also enable a plurality of different images to be captured from a plurality of different incident beams of light 11 by filtering out the unwanted beams of light. The plurality of filters 20, 22 may enable a plurality of images to be captured sequentially by the image sensor 9. As each of the original input beams of light 11 may come from a different location this may enable a plurality of different images to be captured.

In some examples the filters 20, 22 may comprise polarizing filters or colour filters or any other suitable filters.

It is to be appreciated that the apparatus of FIGS. 1A and 1B both provide a type of filtering. In the example FIG. 1A the shutters 21 provide a temporal filter. In the example of FIG. 1B an in-coupling filter 20 is provided between the collimating optical arrangement 17 and the input diffraction grating 5 and a matching out-coupling filter 22 is provided between the output diffraction grating 7 and image sensor 9.

Figure 2:
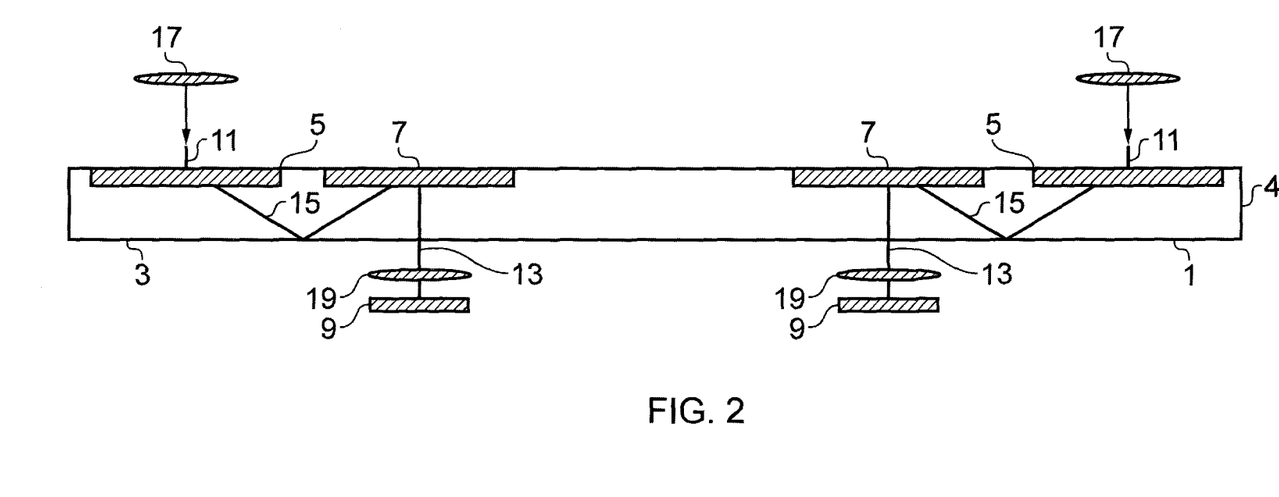
FIG. 2 schematically illustrates an apparatus according to a second example embodiment of the disclosure.

FIG. 2 illustrates an apparatus 1 according to another embodiment of the disclosure. Where the components are the same or similar to the apparatus 1 illustrated in FIG. 1 the same reference numerals will be used.

The apparatus 1 illustrated in FIG. 2 also comprises a light guide element 3. The light guide element 3 of the embodiment illustrated in FIGS. 1A and 1B also comprises a plurality of diffraction gratings 5, 7. A plurality of collimating optical arrangements 17 are also configured to provide a plurality of incident beams of light 11 as described above in relation to FIGS. 1A and 1B.

The apparatus 1 illustrated in FIG. 2 differs from the apparatus of FIG. 1 in that the light guide element 3 comprises a plurality of output diffraction gratings 7 in addition to the plurality of input diffraction gratings 5. As a plurality of input diffraction gratings 7 are provided, the apparatus 1 also comprises a plurality of image sensors 9 and focussing optical arrangements 19. In the embodiment of FIG. 2 a focussing optical arrangement 19 and image sensor 9 are provided for each of the plurality of output diffraction gratings 7.

In the example illustrated in FIG. 2 the light guide element 3 comprise two input diffraction gratings 5 and two output diffraction gratings 7. The number of input diffraction gratings 5 is equal to the number of output diffraction gratings 7. In some embodiments of the disclosure different numbers of input and output gratings 5, 7 may be provided.

In the embodiment of FIG. 2 there are no shutters 21 or filters 20 provided between the collimating optical arrangements 17 and the input diffraction gratings 5. The plurality of incident beams of light 11 may be incident on the input diffraction gratings 5 simultaneously so that a plurality of in-coupled beams of light 15 propagate through the light guide element 3 simultaneously.

As a plurality of output diffraction gratings 7 are provided each of the plurality of in-coupled beams of light 15 may be coupled out of the light guide element 3 by a different output diffraction grating 7 and provided to a different image sensor 9. This may enable a plurality of different images to be captured from a plurality of different incident beams of light 11. As a plurality of image sensors 9 are provided in the example embodiment of FIG. 2 the plurality of images may be captured simultaneously.

The above described apparatus 1 provides a multi-view image capturing apparatus 1 which enables a plurality of images to be captured where the images can be accurately aligned. In some embodiments the images may be aligned without the use of additional software. As the diffraction gratings 5, 7 can be provided on the same substrate the diffraction gratings 5, 7 may be identical. This ensures that the input beams of light 11 are parallel for the same viewing angles of the input diffraction gratings 5. This means that the same viewing angle corresponds to the same point on the image sensor 9 for the different input diffraction gratings 5. The use of identical diffraction gratings 5, 7 may preserve the angular information of the input beams of light 11.

As the diffraction gratings 5, 7 are provided on the same substrate there is no need for additional alignment of other components.

Figure 3:
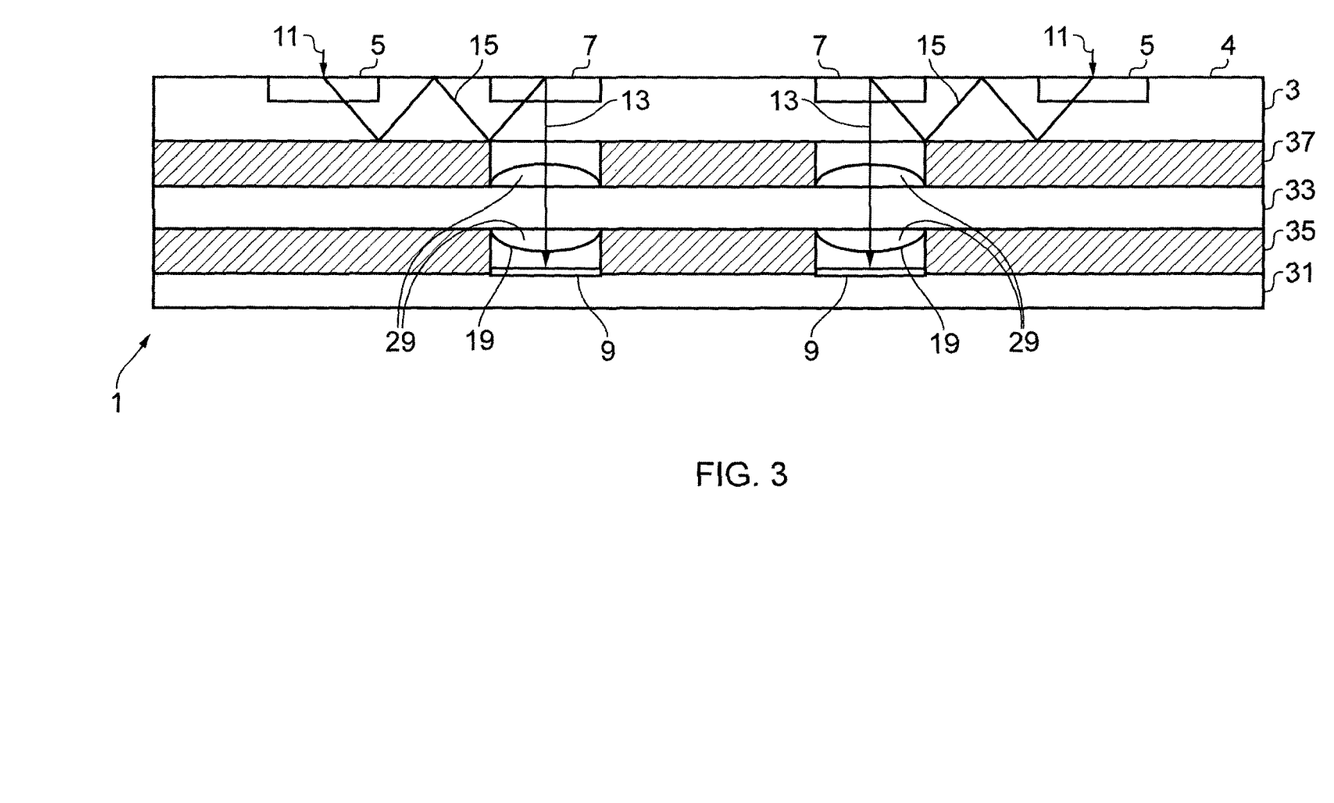
FIG. 3 schematically illustrates an apparatus according to a third example embodiment of the disclosure.

FIG. 3 schematically illustrates an apparatus according to a third example embodiment of the disclosure. Where the components are the same or similar to the apparatus 1 illustrated in FIGS. 1A, 1B and 2 the same reference numerals will be used.

The apparatus 1 illustrated in FIG. 3 is similar to the apparatus 1 illustrated in FIG. 2 in that it comprises a light guide element 3 comprising a plurality of input diffraction gratings 5 and a plurality of output diffraction gratings 7. The apparatus 1 also comprises a plurality of focusing optical arrangements 19 and a plurality of image sensors 9 as described above in relation to FIG. 2.

In the example apparatus 1 illustrated in FIG. 3 the image sensors 9 are mounted on a first substrate 31. The first substrate 31 may be a wafer substrate. The different image sensors 9 may be provided on the same substrate 31.

The focusing optical arrangements 19 are provided on a second substrate 33. The second substrate 33 may also be a wafer substrate. In the example of FIG. 3 the focusing optical arrangements 19 comprises a plurality of optical devices 29 such as lenses. In the embodiment of FIG. 3 two lenses are illustrated, however it is to be appreciated that any number of components may be provided.

In the example embodiment of FIG. 3 the optical devices 29 are mounted on either side of the second substrate 33.

A first spacer layer 35 is provided between the first substrate 31 and the second substrate 33. The thickness of the spacer layer 35 may control the distance between the focusing optical arrangement 19 and the imaging sensor 9. A second spacer layer 37 is provided overlaying the second substrate 33. The light guide element 3 is provided overlaying the second spacer layer 37.

The first substrate 31 and the second substrate 33 are arranged overlaying each other and aligned so that the focusing optical arrangements 19 are positioned to provide the out-coupled beams of light 13 from the output diffraction grating 7 to the image sensors 9.

Figure 4:
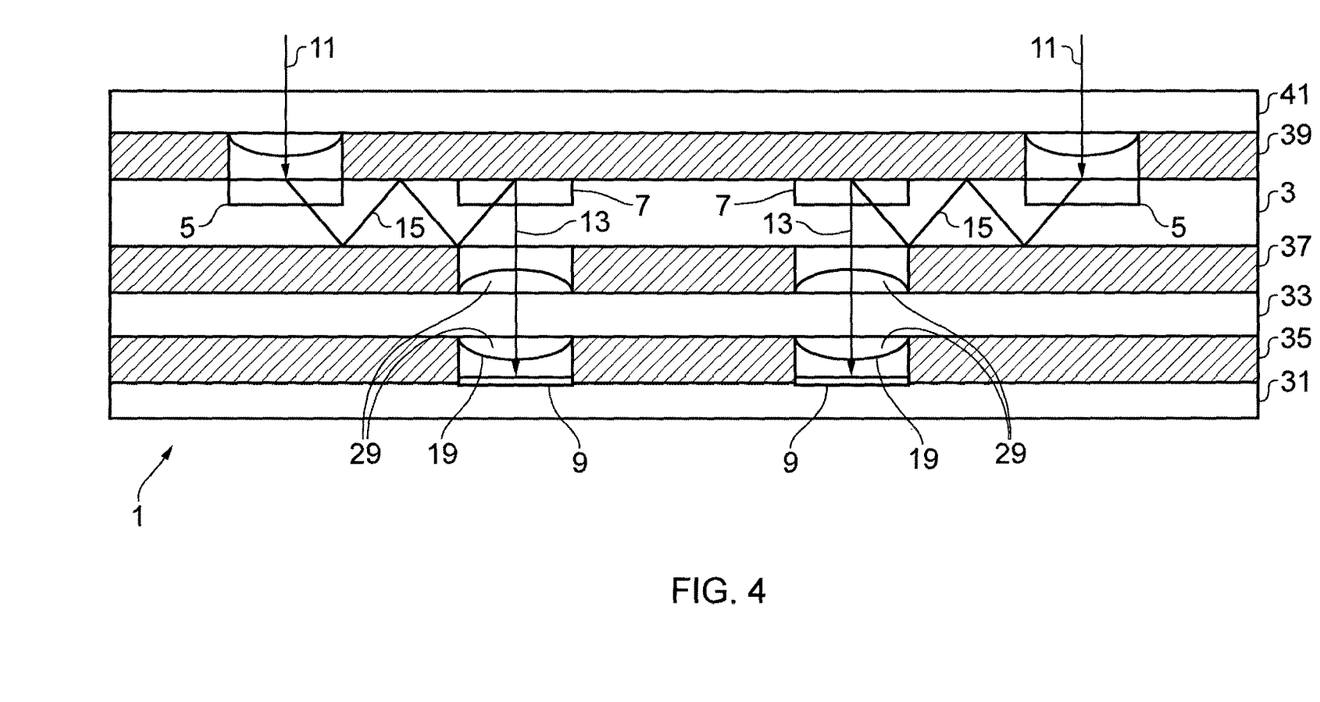
FIG. 4 schematically illustrates an apparatus according to a fourth example embodiment of the disclosure.

FIG. 4 schematically illustrates an apparatus according to a fourth example embodiment of the disclosure. Where the components are the same or similar to the apparatus 1 illustrated in FIGS. 1, 2 and 3 the same reference numerals will be used.

The apparatus 1 illustrated in FIG. 4 is similar to the apparatus 1 illustrated in FIG. 3 in that it comprises a light guide element 3 comprising a plurality of input diffraction gratings 5 and a plurality of output diffraction gratings 7 and also a plurality of image sensors 9 mounted on a first substrate 31 and a plurality of focusing optical arrangements 19 mounted on a second substrate 33. The apparatus illustrated in FIG. 4 also comprises first and second spacer layers, 35, 37, as described above in relation to FIG. 3

The apparatus 1 illustrated in FIG. 4 further comprises a third spacer layer 39. The third spacer layer 39 is provided overlaying the light guide element 3. A third substrate 41 is also provided. The collimating optical arrangement 17 is provided on the third substrate 41.

The apparatus 1 illustrated in FIGS. 3 and 4 may be manufactured using a method such as the example method of FIGS. 5A to 5F.

Figure 5A:
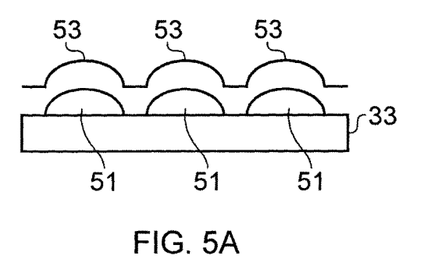
FIGS. 5A to 5F illustrate a method of manufacturing an apparatus according to an example embodiment of the disclosure.

In FIG. 5A a substrate 33 is provided. The substrate 33 may be a wafer substrate. The substrate 33 may comprise any suitable material such as glass or silicon. The substrate 33 may be flat or substantially flat.

In FIG. 5A droplets 51 of a suitable liquid, such as a liquid polymer are dispensed on a first surface the substrate 33. A plurality of droplets 51 may be provided across the surface of the substrate 33.

A master stamp 53 is provided to shape the droplets 51 of the liquid polymer into the required optical components. Different shaped stamps 51 may be provided to produce different optical components.

Figure 5B:
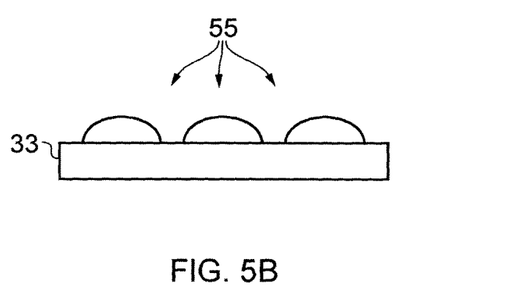

In FIG. 5B the droplets 51 of the liquid polymer are cured to harden the droplets into the shape of the master stamp 53. In the example of FIG. 5B the liquid polymer is cured by exposure to UV light. Other methods of curing may be used in other embodiments of the invention.

Figure 5C:
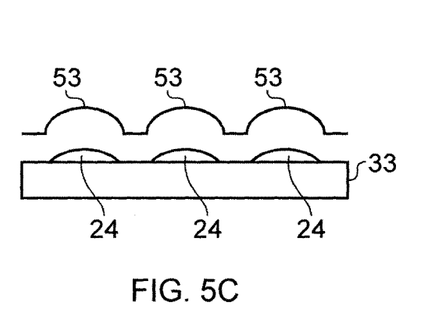

In FIG. 5C the master stamp 53 may be removed from the cured droplets 51. The same master stamp 53 may be sued to produce a plurality of identical components. This leaves an optical device 29 mounted on the surface of the substrate 33

Figure 5D:
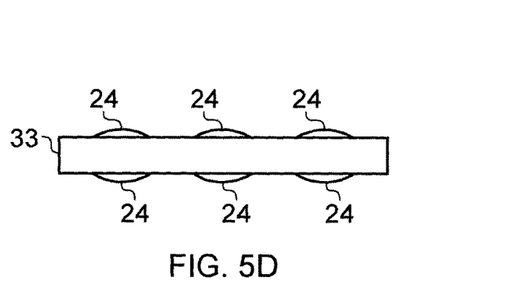

In FIG. 5D the methods of FIGS. 5A to 5C are repeated on the other side of the substrate 33. This may enable a second optical component 29 to be mounted on the reverse side of the substrate 33. In some embodiments the optical components 29 may be mounted on only one side of the substrate 33 and so the method of FIG. 5D may be missed in some embodiments of the disclosure.

In some embodiments of the disclosure the optical components 29 which are provided on either side of the substrate 33 may be different. In other embodiments the optical components 29 which are provided on either side of the substrate 33 may be the same.

Figure 5E:
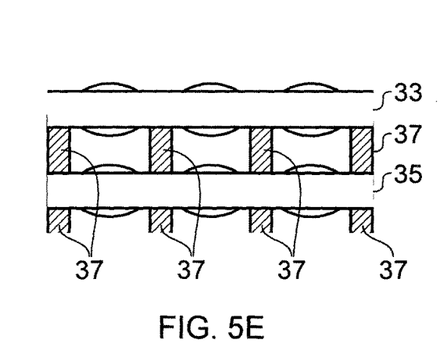

Once the respective optical components 29 have been formed on the substrate 33 the respective substrates can be stacked as illustrated in FIG. 5E. A plurality of substrates 33 are arranged overlaying each other. The respective substrates 33 are aligned so that the optical devices 29 overlay each other.

In the embodiment of FIG. 5E Spacer layers 37 are provided between the respective substrates 33. The spacer layers 37 may enable the spacing between the respective optical components to be controlled.

Figure 5F:
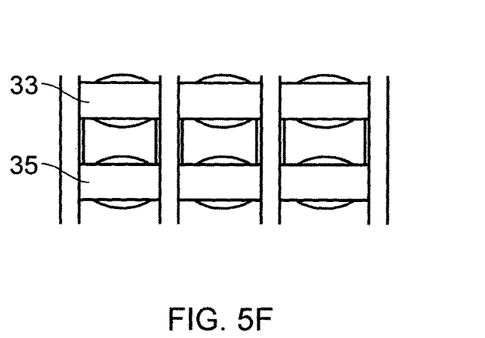

In FIG. 5F the components are diced into individual stacks which can then be mounted overlaying the respective image sensors to produce an apparatus 1 as described above.

Therefore embodiments of the disclosure provide a method of manufacturing a thin imaging apparatus 1. The apparatus 1 may be thin enough to enable it to be integrated into apparatus such as mobile telephones and tablet computers or other similar devices.

The method of manufacturing also enables the respective components to be aligned accurately with respect to each other. Also as the components may be made in identical conditions this may enable identical imaging devices to be provided.

The method also allows for flexibility in the design of the apparatus 1. The position of the input diffraction gratings 5 and the output diffraction gratings 7 may be selected as required. This may enable the apparatus 1 to be integrated into other devices more effectively.

FIGS. 6A to 6D illustrate an example apparatus 1 according to embodiments of the disclosure. The apparatus 1 of FIGS. 6A to 6D may have been manufactured using the method of FIGS. 5A to 5F. Where the components are the same or similar to the apparatus 1 illustrated in the previous figures the same reference numerals will be used.

Figure 6A:
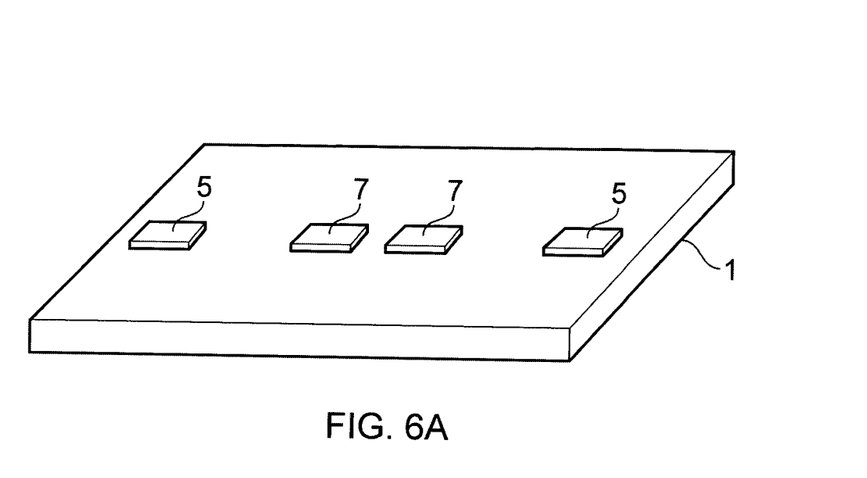
FIGS. 6A to 6D illustrate example apparatus according to embodiments of the disclosure.

In the embodiment illustrated in FIG. 6A the apparatus 1 comprises two input diffraction gratings 5 and two output diffraction gratings 7. In FIG. 6A the input diffraction gratings are provided spaced from each other. The output diffraction gratings 7 are provided between the two input diffraction gratings 5.

In the example embodiment of FIG. 6A the input diffraction gratings 5 and the output diffraction gratings are provided aligned with each other so that all of the input and output diffraction gratings 5, 7 are provided in a single straight line. In the particular embodiment of FIG. 6A the spacing between the first input diffraction grating 5 and the first output diffraction grating 7 is equal to the spacing between the second input diffraction grating 5 and the second output diffraction grating 7.

Figure 6B:
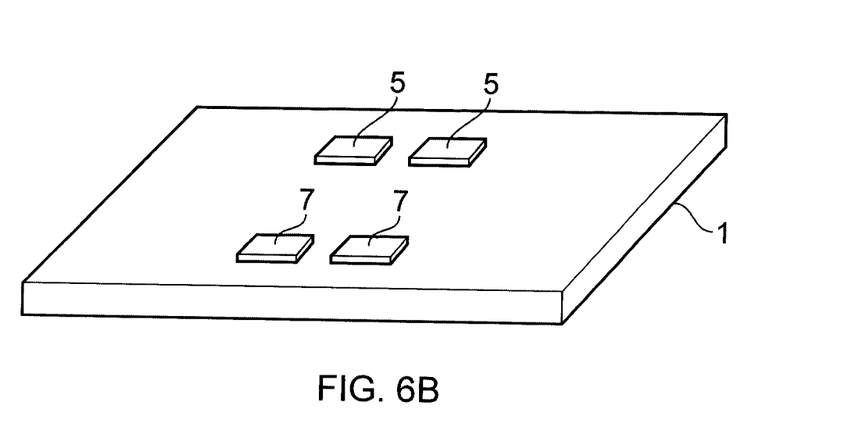

FIG. 6B illustrates an apparatus 1 similar to the apparatus 1 of FIG. 6A. The apparatus 1 of FIG. 6B also comprises two input diffraction gratings 5 and two output diffraction gratings 7. However the diffraction gratings 5, 7 are arranged in a different configuration.

In FIG. 6B the input diffraction gratings 5 are provided closer together than in the embodiment illustrated in FIG. 6A. In the embodiment of FIG. 6B the two input diffraction gratings 5 are provided closely spaced from each other. The two input diffraction gratings 5 are provided in a line.

The two output diffraction gratings 7 are provided spaced from the two input diffraction gratings 5. The two output diffraction gratings 7 are also provided in a line. The line of output diffraction gratings 7 is parallel to the line of input diffraction gratings 5. The distance between the left hand input diffraction grating 5 and the left hand input diffraction grating 7 may be the same as the distance between the right hand input diffraction grating 5 and the right hand input diffraction grating 7. The respective diffraction gratings 5, 7 in FIG. 6B may be arranged in a quadrilateral or rectangular arrangement rather than the straight line arrangement of FIG. 6A.

Therefore the example embodiments of FIGS. 6A and 6B provide different arrangements which can be used with different camera spacing. The camera spacing which is needed may be determined by the device which the apparatus 1 is to be located within. Therefore the embodiments of the invention may be suitable for use in a range of different devices.

It is to be appreciated that the respective diffraction gratings 5, 7 may be located in any suitable positions which allows for a flexible design of the image capture apparatus.

Figure 6C:
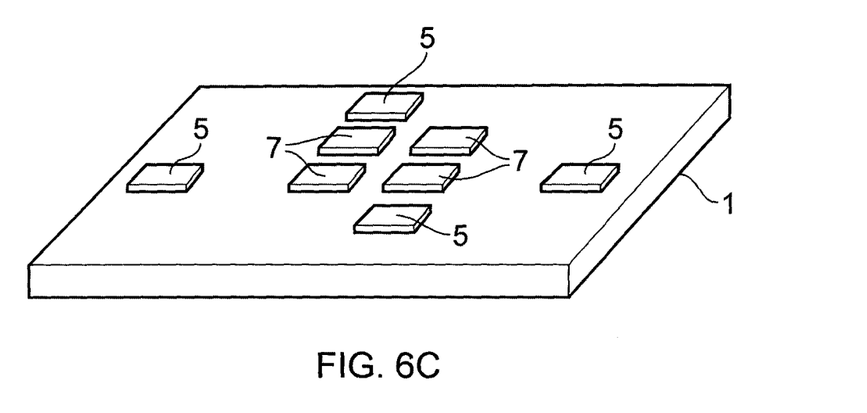
Figure 6D:
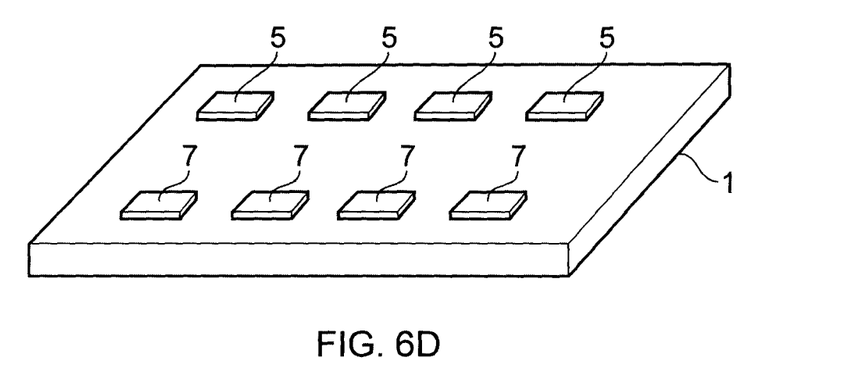

FIGS. 6C and 6D illustrates an apparatus 1 comprising four input diffraction gratings 5 and four output diffraction gratings 7.

In the example of FIG. 6C the input diffraction gratings 7 are spaced horizontally and vertically from each other. This may enable a plurality of images to be captured which account for both horizontal and vertical parallax.

In the particular example of FIG. 6C the output diffraction gratings 7 are arranged in a square in the centre of the apparatus 1. Each of the input diffraction gratings is then provided a long a different side of the apparatus 1. Each input diffraction grating 5 is aligned with a different output diffraction grating 7.

FIG. 6D also illustrates an apparatus 1 comprising four input diffraction gratings 5 and four output diffraction gratings 7. In FIG. 6D the four output diffraction gratings 7 are arranged in a straight line. The four input diffraction gratings 5 are also arranged in a straight line. The line of output diffraction gratings 7 is parallel to the line of input diffraction gratings 5.

In the example of FIG. 6D the input diffraction gratings 7 are aligned in a single straight line to enable images to account for horizontal parallax.

In the above description 'module' refers to a unit or apparatus that excludes certain parts/components that would be added by an end manufacturer or a user.

Although embodiments of the present invention have been described in the preceding paragraphs with reference to various examples, it should be appreciated that modifications to the examples given can be made without departing from the scope of the invention as claimed.

For example, in the embodiments described above the multiple images are captured to enable stereo or three dimensional images to be obtained. It is to be appreciated that embodiments of the invention may have many other applications. For example, the images may be captured using different exposure values to provide images with an increased dynamic range.

In the above described embodiments the image sensors may be identical. In other embodiments of the disclosure the image sensors may be different. For example, the image sensors may have different sensitivity to different wavelengths of light. This may enable increased spectral information to be obtained.

Embodiments of the invention may enable three dimensional movement to be detected. This may enable the apparatus to be used to detect movement. The movement may be, for example, motion of the user of the apparatus. The detected motion of the user could be used as an input to control the apparatus.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
a light guide element comprising a plurality of input diffraction gratings configured to couple a plurality of incident beams of light into the light guide element and at least one output diffraction grating configured to couple the plurality of beams of light out of the light guide element to at least one image sensor to enable a plurality of images to be captured wherein the light guide element is configured to guide the incident beams of light from the input diffraction gratings to the at least one output diffraction grating via total internal reflection, wherein the input diffraction gratings and the at least one output diffraction gratings have the same spacing and wherein the light guide element comprises a surface and wherein the plurality of input diffraction gratings are provided on the surface.

2. An apparatus as claimed in claim 1 wherein the plurality of input diffraction gratings are spaced from each other.

3. An apparatus as claimed in claim 1 wherein the input diffraction gratings and the at least one output diffraction gratings have the same periodic spacing.

4. An apparatus as claimed in claim 1 wherein the input diffraction gratings and the at least one output diffraction gratings are parallel with each other.

5. An apparatus as claimed in claim 1 wherein the apparatus comprises a plurality of filters configured to filter the plurality of incident beams of light.

6. An apparatus as claimed in claim 5 wherein a first filter is arranged to filter a beam of light before it is incident on an input diffraction grating and a matching filter is arranged to filter a beam of light provided to the image sensor.

7. An apparatus as claimed in claim 1 wherein the apparatus comprises a plurality of shutters configured so that the plurality of incident beams of light are coupled into the light guide element at different times.

8. An apparatus as claimed in claim 1 wherein the light guide comprises a plurality of output diffraction gratings configured to couple the plurality of beams of light out of the light guide element simultaneously.

9. An apparatus as claimed in claim 8 wherein the number of input diffraction gratings is equal to the number of output diffraction gratings.

10. An apparatus as claimed in claim 8 wherein the apparatus comprises a plurality of image sensors configured to detect the plurality of beams of light from the plurality of output diffraction gratings and capture a plurality of images simultaneously.

11. An apparatus as claimed in claim 1 wherein the light guide is mounted on a substrate.

12. An apparatus as claimed in claim 1 wherein the image sensor is mounted on a substrate.

13. An apparatus as claimed in claim 1 wherein a collimating optical arrangement is mounted on a substrate overlaying the light guide.

14. An apparatus as claimed in claim 1 wherein a focusing optical arrangement is mounted on a substrate between the light guide and the image sensor.

15. An apparatus as claimed in claim 1 wherein the at least one output diffraction grating is provided on the surface between the input diffraction gratings.

16. An apparatus as claimed in claim 1 wherein the light guide element extends transverse to the surface to a first depth, and the input diffraction gratings are spaced from each other in a lateral direction along the surface of the light guide element by a first lateral separation, wherein the first lateral separation is greater than the first depth.

17. A camera comprising the apparatus as claimed in claim 1.

18. A method comprising assembling an apparatus, the assembling comprising:
    configuring alight guide element such that a plurality of input diffraction gratings of the light guide element couple a plurality of incident beams of light into the light guide element and;
    configuring the light guide element such that at least one output diffraction grating of the light guide element couples the plurality of beams of light out of the light guide element to at least one image sensor to enable a plurality of images to be captured wherein the light guide element is configured to guide the incident beams of light from the input diffraction gratings to the at least one output diffraction grating via total internal reflection, wherein the input diffraction gratings and the at least one output diffraction gratings have the same spacing and wherein the light guide element comprises a surface and wherein the plurality of input diffraction gratings are provided on the surface.

19. A method as claimed in claim 18 wherein the plurality of input diffraction gratings are configured to be spaced from each other.

20. A method comprising assembling an apparatus, the assembling comprising:
    mounting at least one image sensor on a substrate;
    mounting a light guide element to the substrate such that a plurality of input diffraction gratings of the light guide element are configured to couple a plurality of incident beams of light into the light guide element and at least one output diffraction grating of the light guide element is configured couple the plurality of beams of light out of the light guide element to the at least one image sensor to enable a plurality of images to be captured wherein the light guide element is configured to guide the incident beams of light from the input diffraction gratings to the at least one output diffraction grating via total internal reflection, wherein the input diffraction gratings and the at least one output diffraction gratings have the same spacing and wherein the light guide element comprises a surface and wherein the plurality of input diffraction gratings are provided on the surface.

* * * * *

UNITED STATES PATENT AND TRADEMARK OFFICE
CERTIFICATE OF CORRECTION

PATENT NO. : 10,345,501 B2
APPLICATION NO. : 14/432891
DATED : July 9, 2019
INVENTOR(S) : Martin Schrader Page 1 of 1

It is certified that error appears in the above-identified patent and that said Letters Patent is hereby corrected as shown below:

In the Claims

In Claim 18:
Column 13, Line 22, "alight" should be deleted and --a light-- should be inserted.

Signed and Sealed this
Third Day of September, 2019

Andrei Iancu
*Director of the United States Patent and Trademark Office*